United States Patent [19]

Botsolas

[11] 4,054,710

[45] Oct. 18, 1977

[54] LAMINATED INSULATION BLANKET

[75] Inventor: Christos J. Botsolas, New Brunswick, N.J.

[73] Assignee: Johns-Manville Corporation, Denver, Colo.

[21] Appl. No.: 670,016

[22] Filed: Mar. 4, 1976

Related U.S. Application Data

[63] Continuation of Ser. No. 379,643, July 16, 1973, abandoned.

[51] Int. Cl.² .................. B32B 17/02; D03D 15/12
[52] U.S. Cl. ........................... 428/228; 428/246;
428/233; 428/421; 428/255; 428/443; 428/285;
428/286; 428/920; 52/309.16; 428/457;
428/458; 428/315; 428/317; 428/425
[58] Field of Search ............. 52/309; 428/228, 425,
428/246, 233, 421, 255, 443, 285, 457, 458, 286, 315

[56] References Cited

U.S. PATENT DOCUMENTS

| | | | |
|---|---|---|---|
| 2,401,314 | 6/1946 | Quinn | 162/155 |
| 2,514,170 | 7/1950 | Walter et al. | 428/443 X |
| 2,523,022 | 9/1950 | Horstman | 428/443 X |
| 2,739,092 | 3/1956 | Stevenson | 154/93 |
| 3,037,895 | 6/1962 | Quinn | 154/44 |
| 3,212,960 | 10/1965 | Quinn | 428/443 X |
| 3,369,959 | 2/1968 | Noyes | 161/164 X |

OTHER PUBLICATIONS

Zeston Brochure "PVF1171" (published Nov., 1971, pp. 1-6.

Primary Examiner—P. C. Ives
Attorney, Agent, or Firm—Robert M. Krone; Joseph J. Kelly; James W. McClain

[57] ABSTRACT

As a flexible composite insulation, a layer of mass type of insulating material of low heat conductivity is bonded to a multilayer protective jacket. The mass insulation layer is flexible in at least one direction for fitting pipes, etc., and it is preferably a series of parallel contiguous strips of fiber glass or mineral wool batt insulation cemented to the vapor barrier layer of the jacket with their fibers substantially oriented in parallel planes aligned perpendicularly to the jacket. The jacketing material is preferably a combination of vapor barrier film of a metallized polyethylene terephthalate with its aluminum coated face bonded to one face of a layer of glass fiber-reinforced asbestos paper which has its other face bonded to an exterior surface film of polyvinyl fluoride.

16 Claims, 3 Drawing Figures

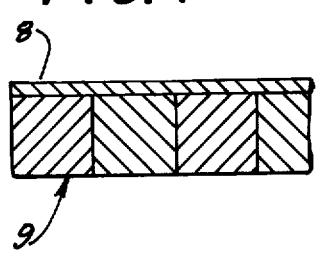
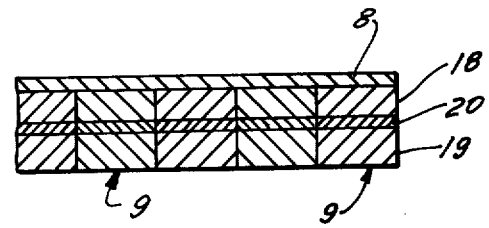
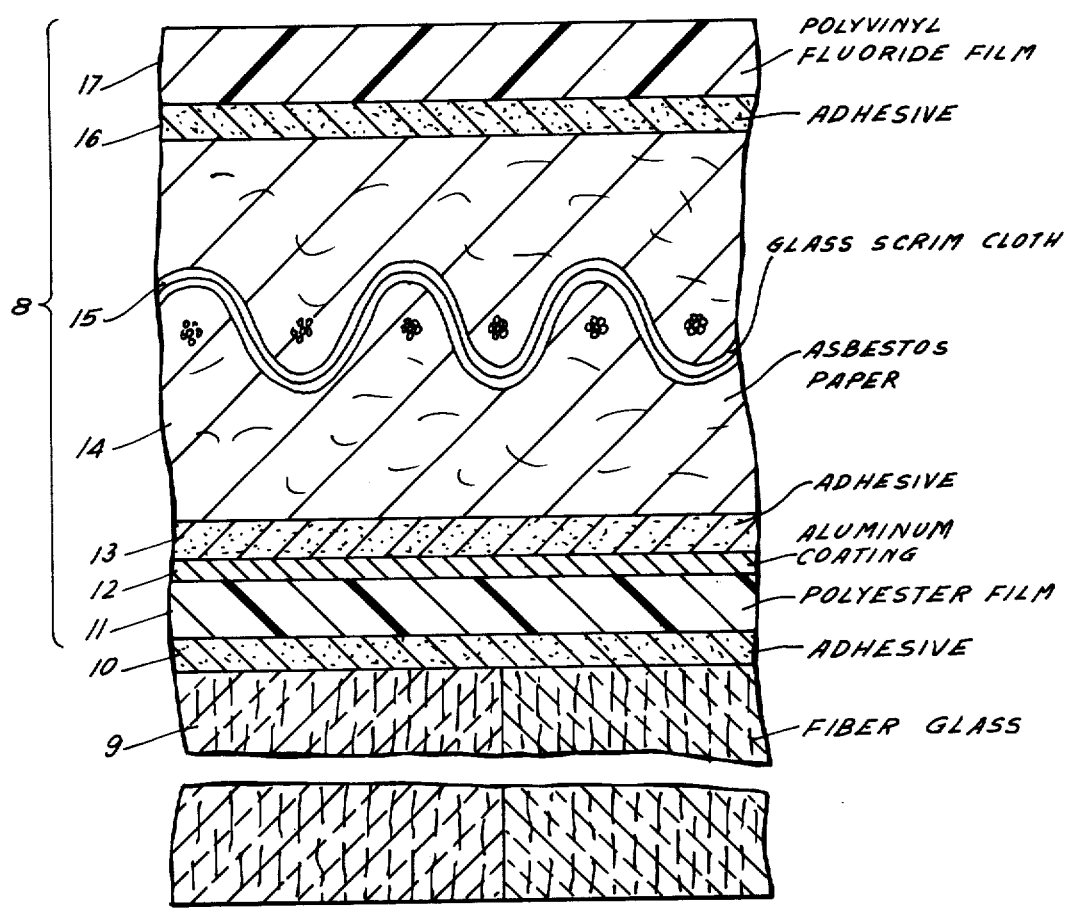

LAMINATED INSULATION BLANKET

This is a continuation of application Ser. No. 379,643, filed July 16, 1973, and now abandoned.

BACKGROUND OF THE INVENTION

Cross-Reference to Related Application

Certain uses of the articles of this invention may involve subject matter described and claimed in my concurrently filed application Ser. No. 670,017 entitled "Composite Insulation Jacket."

Field of the Invention

This invention is concerned with composite flexible jacketed insulation for thermally insulating hot and cold pipes and other equipment.

Prior Art

A wide array of materials have been employed or suggested for use in thermal insulation and its protective jackets for application to hot and chilled pipes, vessels, tanks, ducts, etc. Alone or in various aggregations, such jacketing materials have included aluminum and other metallic casings, canvas, asbestos paper as well as coatings of numerous resinous materials. For example, Noyes U.S. Pat. No. 3,369,959 describes a laminate composed of polyvinyl fluoride on a neoprene-impregnated asbestos felt and mentions pipe jacketing among a number of architectural and automotive uses. One type of commercial insulation covering material employs fiber glass yarn patterns as a reinforcement between a flame-retardant kraft paper bonded to one face of aluminum foil to which that paper is bonded, and the foil may have a pigmented vinyl resin coating on its other face. Those reinforcing yarn patterns are usually rather prominently visible on both sides of the products; also the pigmented coating reduces the reflection of heat by the aluminum layer.

Among the many products used as mass type insulation of low heat conductivity by reason of the voids or dead air space therein are flexible and rigid plastic foams, and especially fibers of glass and mineral wool mats in the form of relatively rigid batts or boards. These fibrous articles are usually impregnated with various proportions of a resinous binder, such as phenolic resins.

The flexible jacketed insulation blankets of the instant invention utilize commercial sheet materials but at least two of these have apparently never been employed as elements of such composite blankets as specified herein. Moreover, the present combinations and dispositions of layers and the components included therein are novel; and they provide unusual and improved combinations of numerous desirable results, including of an unexpected nature.

SUMMARY OF THE INVENTION

The present invention relates to flexible jacketed insulating blankets as "one-package" units for covering and thermally insulating pipes and other equipment with surfaces that are flat or have simple curvature. The novel composite articles include one or more of such features as a laminar jacket containing a vapor barrier film or layer of synthetic resin which bears a vapor-deposited coating of a heat reflective metal on its internal unexposed face where it is protected against corrosion by the resin, or a layer of felted asbestos fibers containing reinforcing glass fibers together with a layer of mass type of insulation (e.g., inorganic fiber mat) bonded to the laminated jacket, and especially the combination of such layers with a continuous resin film or layer, preferably a fluorocarbon resin, as a protective external covering in a composite fire-resistive laminate.

Other aspects of the invention are concerned with more specific details, combinations or embodiments which may involve such items as the disposition of the fibrous mat as well as the fibers therein, a vapor barrier film of a linear polyester resin (e.g. transparent polyethylene terephthalate), a reflective aluminum coating on that film, a binder resin (e.g. polyvinyl chloride) in the asbestos layer, fiber glass scrim cloth in the asbestos layer, and a fluorocarbon resin, especially a polyvinyl fluoride film, as the external surface layer.

Still other aspects of the invention as well as its benefits and advantages will be apparent to those skilled in the art upon consideration of the following detailed disclosure.

DESCRIPTION OF THE DRAWING

FIG. 1 is a fragmentary longitudinal sectional view of one embodiment of an article of the invention.

FIG. 2 is a fragmentary greatly enlarged sectional view on the same plane of details of the same article wherein relative thicknesses of the layers are somewhat distorted for the purpose of clearer illustration.

FIG. 3 shows another modification in a sectional view similar to FIG. 1.

DESCRIPTION OF SPECIFIC EMBODIMENTS

The sheet materials of the present invention are composite or laminar articles comprising a plurality of principal layers of a flexible nature that are flexibly bonded into a unitary sheet material suitable for covering and insulating flat surfaces as well as those having simple curves. The many advantages of these novel articles are described hereinafter.

Turning now to the drawings for a survey of the structure of one modification of the laminated article, FIG. 1 is a fragmentary general cross-section through its thickness taken in the machine direction or longitudinal plane. If shows a thin, relatively dense laminar jacket 8 to which is bonded a mass type of insulation in the form of a series of contiguous discrete strips 9 of inorganic fibrous mat material which minimize heat transmission by conduction. FIG. 2 is an enlarged sectional view on the same plane of the same embodiment as in FIG. 1. It depicts the adhesive layer 10 bonding the stips 9 to the multilayer jacket 8 which is composed of the layers designated by reference numerals 11 to 17, inclusive. This composite jacket is constructed by adhesively bonding the entire adjacent faces of three preformed sheet materials into an integral jacketing material which displays an improved combination of properties in comparison with materials of the prior art. In this embodiment, the mass type insulation 9 is bonded to the uncoated face of a vapor barrier layer comprising the polyester resin film 11 which carries an ultrathin vapor-deposited coating 12 of aluminum on its internal face. The metal side or face of this metallized resin is bonded by the adhesive 13 to one face of the central layer 14 of asbestos paper in which is embedded a reinforcing layer 15 of open mesh fiber glass scrim cloth, and layer 14 preferably contains a binder resin also. Another adhesive layer 16 serves to cement the other face of asbestos layer 14 to the inner face of the exterior surface layer 17, a polyvinyl fluoride film.

The insulating material in layer 9 serves to minimize heat transfer by conduction; hence it is a relatively bulky material containing a substantial volume of voids or dead air space. Flexible polyurethane foams and other flexible foamed resins with suitable temperature characteristics may be used for the purpose. However, mat insulations constructed essentially of inorganic fibers, such as glass fibers and mineral wool, are often preferred. They are incombustible and can be employed over a wide-range of operating temperatures. Also, costly ceramic felt insulation may be used in some special cases, as where unusually high temperature conditions justify the extra expense.

Strips 9 may be obtained from relatively rigid conventional inorganic fiber batts or boards which are impregnated with conventional binding agents. For example, typical fiber glass boards with densities of about 0.5 to 2 or more pounds per cubic foot and thicknesses of about 0.5 to 2 inches or more may be cut into strips of about 0.5 to 2 inches width of uniform rectangular cross-section for rearrangement as strips 9 in the present composite articles. Substantial flexure is usually involved in fitting the products of this invention to pipes and other curved surfaces. However, flat fiber glass boards or batts do not possess the necessary flexibility for bending in the transverse direction or any other direction, because the individual fibers or strands are deposited in chopped form in a sequence of parallel layers each on top of the preceding layer and then immobilized with a binding agent. There is random orientation of the fibrous material within each of the parallel layers but relatively few fibers are oriented in depth to extend through any or all of the layers; hence the orientation of the fibers may be described as essentially planar with the fibers being disposed predominantly within a series of substantially parallel planes. As a result, the insulation board or batt is relatively stiff and its surfaces cannot be stretched or reduced in length or width as is necessary in bending a sheet material of substantial thickness. However, this board can be compressed and reduced in thickness, i.e. in a direction substantially normal to the planar fiber alignment. In the present articles, the strips 9 are disposed in a way that recrients the planes of fiber orientation so that these planes are substantially perpendicular or normal to the surfaces of the new laminated article rather than parallel thereto. Such reorientation of the fiber planes can be expressed as substantially normal to the laminar jacket and parallel to one another. Thus with the strips 9 aligned in that manner and bonded to a sheet of flexible jacketing material 8, the composite sheet may be flexed with the strips 9 being compressed and becoming narrower during concave flexure of that side of the composite sheet.

The adhesive 10 used for bonding the mass type insulation 9 to the surface of the laminar jacket may be a hot melt adhesive or one of the adhesives disclosed hereinafter including epoxy resins, and synthetic nitrile ribber modified with a phenolformaldehyde resin, as well as others known in the art. Hot melt adhesives often contain a relatively low molecular weight substance of the group consisting of ester and paraffin waxes, and rosin, alkyd, terpene and coumarone-indene resins blended with a limited proportion of such higher molecular weight polymers as polyvinyl acetate, polybutyl methacrylates, polyethylene, polyisobutylene and polystyrene along with a liquid plasticizer. Among the formulations recommended for general hot melt bonding are mixtures of polyethylene, polyvinyl acetate and the polyamide reaction products of dimerized fatty acids and diamines.

For the jacket section of the article, a wide variety of plastic compositions may be utilized for the vapor barrier film 11 in meeting the requirements of forming a film that is a suitable substrate for vapor metallization and displaying a low permeability for water vapor—for example, low enough for a rating below about 2 perms for the laminar jacket, and preferably as low as possible. Linear polyesters, the polymeric reaction products of dihydroxy alcohols and dibasic organic acids may be used; and excellent results are obtainable with metallized polyethylene terephthalate film. The latter film exhibits very low permeability for water vapor and high dimensional stability in combination with good heat resistance. A resin that is transparent is preferred for obtaining the full benefit of the metal coating as a heat reflector.

It is also contemplated that other resins may be used for film 11 as exemplified by polyvinyl chloride, polyvinyl fluoride and other fluorocarbons, and even copolymers of vinyl chloride and vinylidene chloride in applications where shrinkage is no problem.

Resin layer 11 is omitted in some embodiments of this invention when a vapor barrier is not needed, but unfortunately the resulting composite thereby loses some other desirable qualities. That film provides a convenient, economical and commercially available carrier for the metal coating that may be purchased in either the metallized or the uncoated state; hence it is a very light weight, flexible and efficient heat reflecting form of insulation as well as a highly effective vapor barrier. Moreover, it protects one side of the thin metal layer 12 against corrosion by sealing the resin side of the metal coating against exposure to any vapors, gases and liquids, and such corrosion would greatly impair its efficiency in reflecting heat radiation.

The metal coating may be any metal capable or reflecting heat and of being applied by conventional vapor deposition procedures to form a mirror-like coating 21 on the resin film 11. Thus, the metal may be aluminum, chromium, copper, nickel, silver, gold, etc., or alloys of these or other metals, but aluminum is generally preferred for good results and economy. Moreover, preformed polyethylene terephthalate film with a vapor deposition coating of aluminum on one side is currently available in adequate quantities at reasonable cost.

Thickness of the metallized vapor barrier layer may range widely, for instance from about 0.25 to 4 mils (thousandths of an inch), but it is typically between about 0.5 and 1.5 mils; and the thickness of the vapor deposited metal may be ignored as an ultrathin coating of less than 0.01 mil. However, in comparison with an uncoated resin, that coating provides a much lower vapor permeability in the metallized resin film.

The felted asbestos layer 14 is another preformed component of the jacket and it is usually termed asbestos paper since it is formed from a slurry of individual asbestos fibers in water on a traveling wire screen similarly to paper making operations. The reinforcing glass scrim cloth 15 is introduced at the proper interval in the process for a mid-depth location while the asbestos fibers are settling on the screen. Also, it is desirable for the slurry to contain a binder material, such as a latex of rubber or polyvinyl chloride, that remains flexible while increasing strength of layer 14. A flexible polyvinyl chloride binder is generally preferred for its self-extinguishing property, and it may be present in an amount of about 10 to 30% (preferably about 15-20%) of the dry weight of the asbestos layer.

Layer 14 is the bulkiest layer in the laminar jacket for it typically is about 15 to 30 mils thick, and such bulk is helpful in minimizing "telegraphing" of the pattern of scrim cloth onto the outer surface of the jacket. However, the fibrous asbestos layer may be as thick as 40 or more mils or as thin as about 10 mils depending considerably on the desired coefficient of conductive heat transfer through the jacket as well as its flexibility, for both properties are mainly dependent on the thickness of the asbestos layer.

The scrim cloth 15 may be woven from polyethylene terephthalate or nylon threads when maintaining the strength of the jacket at high temperatures is not important, but fiber glass threads are usually preferable. The weave of the cloth may have a thread count of from 2 × 2 up to 12 × 12, and an 8 × 8 count is typical.

The exterior skin or surface layer 17 is a continuous or unbroken flexible film of a solid resin as exemplified by polyvinyl chloride for indoor usage or fluorocarbon resins, or acrylic resins, such as polymethyl methacrylate. The fluorocarbons are preferred for most purposes, but the expensive chlorotrifluoroethylene and tetrafluoroethylene polymers seldom, if ever, justify their extra cost over polyvinyl fluoride. The latter is being manufactured in the form of strong films of 0.5 to 4 mil thickness with various pigments incorporated therein. Polyvinyl fluoride film is an extremely durable preformed finish for exposure to all types of weather, common solvents, strong cleaning agents, corrosive liquids and gases. This film is desirably rendered surface receptive to adhesive bonding by surface activation on both of its faces as may be accomplished according to the teachings of Simms U.S. Pat. No. 3,133,854, Usala et al U.S. Pat. No. 3,228,823 and Noyes U.S. Pat. No. 3,369,959. Those patents are incorporated herein by reference as subordinate disclosures relative to such background on surface activation and some of the adhesives for activated polyvinyl fluoride surfaces. In addition to the epoxy resin, vinyl addition polymers, polyalkyl acrylate and other adhesives mentioned therein, one may employ the cements based on synthetic rubbers as described in Saunders et al U.S. Pat. No. 2,376,854 which is also incorporated herein by reference. In general, an elastomeric adhesive is preferred for forming flexible bonds between all of the flexible layers. The aforesaid adhesives may be employed as the bonding agents for both faces of the asbestos felt layer 14, that is in both of the thin layers 13 and 16. In the case of adhesive layer 16, even when the exterior resin skin 17 is pigmented, it is often desirable for maximum resistance to deterioration from prolonged sunlight exposure to incorporate in the adhesive an agent capable of resisting such degradation. Such agents are well known and exemplified by the carbon black mentioned in certain of the aforesaid patents or an ultraviolet absorber, such as a compatible substituted benzophenone or substituted benzotriazole selected from those listed in the chart on pages 1008-1009 of the 1969-1970 Modern Plastics Encyclopedia of Breskin Publications, Inc., Bristol, Conn.

Another embodiment of the jacketed insulation of this invention is illustrated in FIG. 3 wherein a very thin aluminum foil 20 is interposed in the mass insulation to reflect heat radiation. In this particular modification, each of the fibrous mat strips 9 is composed of two sections 18 and 19 bonded to opposite faces of the foil 20 with an adhesive known in the art as effective both on aluminum and on glass or mineral wool fibers. The sections 19 and 20 are cut from the same types of fibrous boards or batts as the unitary strips 9 in the embodiment of FIGS. 1 and 2, and the fiber orientation relative to the laminar jacket 8 and bonding are also similar. In general, the foil 20 is employed as a primary heat reflector along with the metal coating 12, and there is some evidence that this structure can result in a surprising reduction in the shin temperatures of outer layer 17 from those obtained under comparable conditions with a jacketed insulation composite differing only in the omission of the foil 20.

To illustrate a method of manufacturing a specific jacketed insulation according to this invention, the strips 9 of fibrous board and the laminar jacket 8 are made separately and then bonded together with especial attention to fiber reorientation. In forming the jacket, an adhesive coating is applied to one of the two activated faces of a 1.5 mil thick web 17 of a suitable, commercially available polyvinyl fluoride by passing the web through a conventional coating device containing a solution of a synthetic rubber adhesive of the butadieneacrylonitrile type in a naphtha-based solvent, also commercially available. Next, the adhesive coating is dried during travel of the web through an oven; then the coated side of the plastic web is laminated in contact with one face of a web 14 of a 25-mil thick suitable asbestos paper product that is advantageously reinforced, as by an internal glass fiber scrim cloth 15 of 8 × 8 count and including a polyvinyl chloride binder resin. The bonding is accomplished by passage of the assembled webs through nip rolls with an unheated rubber roll bearing on the exposed polyvinyl fluoride face while a heated steel roll bears on the asbestos paper side. Thereafter, in similar procedures, a suitably metallized 0.9 mil web 11 of polyethylene terephthalate is coated on its metallized face of vapor-deposited aluminum 12 with the same synthetic rubber adhesive, oven dried and laminated onto the asbestos face of the asbestos-polyvinyl fluoride combination in the same nip rolls. The resulting multilayer web is a laminar jacket ready for bonding to reorient fiber glass mat as described hereinafter.

The particular jacketing material produced in the foregoing procedure has an overall thickness of 25 mils, the same as the original thickness of the reinforced asbestos layer, as a result of the compacting of that layer by the nip rolls. It possesses a tensile strength that is usually well in excess of 50 pounds per inch of width, and a vapor barrier rating of 0.02 perm (water transmission in grams per hour per square foot per inch mercury pressure differential). The jacket may be employed with temperatures in the polyester film 11 ranging from far below zero (e.g., −200° F.) up to the 325°-375° F. range, and the temperature of pipes, etc. can be considerably higher depending on the thickness of the strips 9 of fiber glass which shield the film 11.

In addition, this jacket has greater flame resistance than pure aluminum which melts at approximately 1220° F. and is presently the most common jacket material for outdoor pipe insulations. The new laminar jacket has successfully withstood oven temperatures of 1500° F. with the glass reinforcing threads remaining intact, shielded by the asbestos; and there are indications that it will withstand higher temperatures and may provide fire resistance at temperatures ranging up to about 2000°. Still other properties and advantages of the jacketed insulation are set forth hereinafter.

In continuing the fabrication of the composite article, 1-inch thick fiber glass boards with a density approximating 2 pounds per cubic foot and a temperature rating of 850° F. are cut transversely into strips of 1 inch width. A coating 10 of a conventional hot melt adhesive as mentioned earlier is applied in the molten state to the exposed face of the polyester film 11 of the web of jacketing material. After being reoriented, the fiber glass strips are bonded with their lengths disposed transversely (i.e., crosswise or opposed to the machine direction) of that web and in firm contact with adhesive coating 10 while it is still in the fluid state. The reorientation involves rotating each strip 90° about its length, so that the parallel planes in which the glass fibers are predominantly disposed are substantially normal to the web or surface of the jacket; also it is desirable for convenient roll storage that these planes extend transversely of the web. Strips 9 are parallel and preferably in contact with one another, but they are desirably discrete with no substantial adhesive bonding between their contiguous sides. After cooling of the adhesive, the resulting jacketed insulation may be flexed and bent into substantial curves around axes transverse to said web without cracking, buckling or forming unsightly wrinkles.

The composite jacketed insulation of this invention can be easily fitted and fastened with the resin film 17 on the outside as the exposed surface layer and strips 9 in direct contact with pipe or other equipment surfaces to be covered. Only simple conventional hand tools, such as scissors or knife, stapler and brush are needed. The joints in the insulation installed on the equipment may be butted and taped and/or banded; however an overlapped and cemented joint is often preferred for neatness and for better sealing. It is a simple matter to provide for overlapped side and end joints by cutting a piece of the composite insulation a few inches oversize in both length and width; then removing several of the fiber mat strips 9 along one edge to provide an overlapping side margin of the jacket 8 of sufficient width for bonding, and similarly removing a few inches from one end of each remaining strips 9 while leaving the jacket material intact there as an overlapping end margin. A contact adhesive (e.g., a synthetic rubber-phenolic resin type) is suitable for bonding the overlapping margin resin layer 11 to the underlying marginal area of the bondable surface of resin lay 17 (e.g., an activated fluorocarbon resin surface) of the jacket. Alternatively, the overlapped seam may be fastened with staples, desirably made of monel or other corrosion-resistant alloy; but it is often preferable to both staple and cement many joints. In applications where a vapor or liquid barrier is necessary or desirable, or merely for improving the appearance of the installation, the staples and overlapped seams may be sealed with a suitable tape. A tape matching the exterior resin layer 17 is generally preferred; for instance, covering and sealing an exterior film of polyvinyl fluoride with a polyvinyl fluoride tape of the same composition, color and thickness and two-sided activation, but also bearing a coating of a pressure-sensitive adhesive which is protected by a readily releasable paper liner. The prior surface receptive or activating treatment of the polyvinyl fluoride film assures durable adhesion of the adhesive face of the tape to both the exposed surface of the exterior layer of the jacket and to the uncoated surface of the tape itself.

In addition to the convenience of fitting a complete insulation as a one piece material, one or adjacent or separated strips 9 may be removed entirely a substantial part of the depth thereof in solving difficult problems of fitting the insulating material around tight bends, small diameter pipes or in crowded locations.

The unique combinations of structural features in the present jacketed insulation materials provided outstanding combinations of desirable properties and more of such benefits than were available in prior art, including some advantages which are unique. Moreover, certain of the structural arrangements produce complementary or cooperative effects. For illustration, in the asbestos layer 14, the embedded glass fiber strands of scrim cloth 15 greatly reinforce the strength of the felted asbestos but the glass has a much lower melting point and flame resistance than asbestos; however, the asbestos covers and insulates the glass fibers, and this protection enables the glass fibers to maintain a substantial strengthening of the asbestos layer even when the surface temperatures of the outer face of the asbestos exceed the softening or melting temperature of the strengthening agent, the glass fibers. These complementary protective effects are particularly significant in installations where flash fires may occur and it is important to shield pipe or equipment surfaces from contact with flames. Without reinforcing fiber glass threads, the binder resin in the asbestos paper would burn or decompose with a resulting loss of binding properties, and the asbestos paper would tend to collapse or tear as a result of the asbestos fibers falling apart at temperatures at which the combined glass fiber and asbestos layer described herein would retain its configuration and substantial strength from its intact glass strands embedded in shielding asbestos that is held together mainly by those glass strands.

Somewhat similarly, the internal disposition of the metal coating 12 enables its covering transparent resin layer 11 to protect the metal against corrosion from acid, alkaline, oxidizing or other corrosive substances (e.g., during careless storage or from the alkali present in some insulating materials) and thus to maintain its efficiency in reflecting heat radiation. Another cooperative effect resides in the fact that the metal coating greatly enhances the vapor barrier effect of the resin film and permits obtaining very low perm ratings with a very thin and flexible metallized resin film. For instance, the moisture vapor permeability of uncoated polyethylene terephthalate film is typically of the order of ten times of the same film with an ultrathin coating of vapor-deposited aluminum.

The inhalation of air-borne dust particles or fine fibers of asbestos has recently been found to be an occupational health hazard for workers handling asbestos. However, the strips 9 and layer 17 completely enclose the faces of the asbestos layer 14 and thereby minimize or eliminate that hazard for personnel applying the present jacketed insulation to any equipment surface. Moreover, in a preferred embodiment of the invention using an asbestos paper preimpregnated with a substantial amount of a binder agent, the asbestos hazard is likewise minimized or eliminated for workers fabricating the present laminated insulation. Such impregnation with a latex of either rubber or polyvinyl chloride permits this embodiment of the invention to be soaked in water without the delamination which occurs with untreated asbestos paper. Polyvinyl chloride is the preferred binder in view of its self-extinguishing property. The fibrous asbestos serves as the major insulating component within the jacket section for minimizing conductive heat losses through the laminar jacket as well as providing outstanding flame resistance.

The exterior skin 17 provides resistance to the weather and soiling from various causes, and in the case of fluorocarbon resin films, there is outstanding resistance to wind, rain, snow, sandstorms and microorganisms. For example, the preferred polyvinyl fluoride film is tough, abrasion resistant and almost chemically inert, so it is unaffected by substantially all of the strongest common cleaning solvents, and detergents, acids and alkalis at room temperature and usually at elevated temperatures; its pigmented modifications are generally unmatched in fade resistance and strength retention under outdoor conditions or buried in soil. In addition, it has a low moisture absorption of only 0.5%, coupled with high tensile, tear, impact burst strengths; also it is suitable for continuous use at 225° F. and its zero strength temperature is in the 500°-570° range.

The present jacketed insulations have an exceptional array or combination of properties that provide an unusually wide field of use in efficiently insulative hot or cold equipment under any atmospheric or soil burial conditions as well as practically any corrosive conditions likely to be encountered in chemical plants and elsewhere. In addition to their suitability for continuous use at substantially elevated temperatures for periods that are expected to exceed 20 years, the new laminated materials have an unusual degree of fire resistance in respect to retaining their basic configurations at very high temperatures and displaying desirably low smoke ratings. These laminar jackets are tough and flexible enough and mass insulation strong enough so that insulated equipment may be walked on without cracking or loss of vapor barrier properties; and the jackets resist scuffing, abrasion and accidental punctures as well as tearing from stapling; thus they do not present the maintenance problems of conventional insulation mastics, etc. Also the instant jacketed insulations require no painting or repainting, and any surfaces that are soiled, greasy or contaminated with fungi or bacterial growths from external sources can readily be cleaned and/or disinfected without damage using powerful agents including steam, hot water with soap or strong detergents, all commercial organic solvents and disinfectants. The instant insulation composites can be removed for repairing jacketed pipes and equipment and subsequently replaced in an installation that substantially matches the original in efficiency and neat appearance. Thus, the novel jacketed insulators are extremely versatile, economical and convenient materials.

While only a few embodiments of the present invention are described herein for purposes of a full and detailed disclosure, it will be apparent to those skilled in the art that other modifications of such articles are within the purview of the invention. Accordingly, the instant invention should not be construed as limited in any particulars except as may be recited in the appended claims or required by the prior art.

What is claimed is:

1. A flexible jacketed thermal insulation blanket which consists essentially of:
    a. a flexible thermal insulation element comprising at least one layer of mass type thermal insulation of low thermal conductivity and which is flexible in at least one direction; and adhered thereto in a laminar relationship;
    b. a flexible jacket element consisting essentially of;
        i. a vapor barrier layer consisting essentially of a first polymeric film having deposited on the interior face thereof a thin coating of a reflective metal, said polymeric film being selected from the group consisting of polyester and halocarbon polymeric film;
        ii. a fibrous insulating layer consisting essentially of asbestos fiber reinforced with an open mesh scrim cloth; and
        iii. an exterior layer consisting essentially of a second polymeric film selected from the group consisting of halocarbon and acrylic polymeric films;
        the uncoated face of said first polymeric film being adhered to said thermal insulation element, the metal coated face of said first polymeric film being adhered to one face of said fibrous insulating layer, and the other face of said fibrous insulating layer being adhered to said second polymeric film.
2. The article of claim 1 wherein said first polymeric film consists essentially of a polyester film.
3. The article of claim 2 wherein said polyester film is transparent.
4. The article of claim 3 wherein said transparent polyester film consists of essentially of polyethylene terephthalate film.
5. The article of claim 1 wherein said scrim cloth is woven from fiberglass, polyethylene terephthalate, or nylon threads.
6. The article of claim 5 wherein said scrim cloth is woven from fiberglass threads.
7. The article of claim 1 wherein said second polymeric film is a halocarbon polymer film.
8. The article of claim 7 wherein the halocarbon polymer is a polyvinyl chloride resin or a fluorocarbon resin.
9. The article of claim 8 wherein the halocarbon polymer is polyvinyl chloride or polyvinyl fluoride.
10. The article of claim 9 wherein the halocarbon polymer is a polyvinyl fluroide.
11. The article of claim 1 wherein said reflective metal is aluminum, chromium, copper, nickel, silver, gold, or alloys thereof.
12. The article of claim 11 wherein said reflective metal is aluminum.
13. The article of claim 1 wherein said thermal insulating element is selected from the group consisting of inorganic fibers and foamed resins.
14. The article of claim 13 wherein said thermal insulating element comprises inorganic fibers.
15. The article of claim 14 wherein said inorganic fibers comprises glass fibers.
16. The article of claim 14 wherein said thermal insulating element comprises polyurethane foam.

* * * * *